(12) United States Patent
Grayson et al.

(10) Patent No.: US 8,400,921 B2
(45) Date of Patent: Mar. 19, 2013

(54) SYSTEM AND METHOD FOR PROVIDING RATE CONTROL IN A NETWORK ENVIRONMENT

(75) Inventors: Mark Grayson, Maidenhead (GB); Jayaraman R. Iyer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 502 days.

(21) Appl. No.: 12/726,224

(22) Filed: Mar. 17, 2010

(65) Prior Publication Data

US 2011/0228673 A1 Sep. 22, 2011

(51) Int. Cl.
*G08C 15/00* (2006.01)

(52) U.S. Cl. ........ 370/232; 370/230; 370/235; 370/236; 370/252

(58) Field of Classification Search .................. 370/229, 370/230, 230.1, 232, 235, 236, 236.1, 236.2, 370/241, 252
See application file for complete search history.

(56) References Cited

U.S. PATENT DOCUMENTS

| | | | |
|---|---|---|---|
| 5,432,907 A | 7/1995 | Picazo et al. | |
| 6,094,578 A | 7/2000 | Purcell et al. | |
| 6,108,789 A | 8/2000 | Dancs et al. | |
| 6,185,205 B1 | 2/2001 | Sharrit et al. | |
| 6,233,315 B1 | 5/2001 | Reformato et al. | |
| 6,385,651 B2 | 5/2002 | Dancs et al. | |
| 6,745,246 B1 * | 6/2004 | Erimli et al. | 709/238 |
| 6,813,250 B1 | 11/2004 | Fine et al. | |
| 6,912,389 B2 | 6/2005 | Bright et al. | |
| 7,072,952 B2 | 7/2006 | Takehiro et al. | |
| 7,339,900 B2 | 3/2008 | Perlman | |
| 7,345,991 B1 | 3/2008 | Shabtay et al. | |
| 7,352,707 B2 | 4/2008 | Ho et al. | |
| 7,369,513 B1 | 5/2008 | Sankaran | |
| 7,460,492 B2 | 12/2008 | Portolani et al. | |
| 7,463,597 B1 | 12/2008 | Kompella | |
| 7,555,546 B1 | 6/2009 | Anumala | |
| 7,574,202 B1 | 8/2009 | Tsao et al. | |
| 7,685,295 B2 | 3/2010 | Myers et al. | |
| 8,194,556 B2 * | 6/2012 | Tacconi et al. | 370/252 |
| 2002/0191572 A1 | 12/2002 | Weinstein et al. | |
| 2005/0118946 A1 * | 6/2005 | Colban et al. | 455/3.06 |
| 2005/0223111 A1 | 10/2005 | Bhandaru et al. | |
| 2005/0256969 A1 | 11/2005 | Yancey et al. | |

(Continued)

OTHER PUBLICATIONS

USPTO Feb. 7, 2012 Response to Nov. 9, 2011 Nonfinal office Action from U.S. Appl. No. 12/539,446.

(Continued)

*Primary Examiner* — Chi Pham
*Assistant Examiner* — Weibin Huang
(74) *Attorney, Agent, or Firm* — Patent Capital Group

(57) ABSTRACT

A method is provided in one example embodiment and includes identifying a bandwidth parameter associated with a network link. The method includes evaluating a bandwidth request associated with user equipment, the bandwidth request is associated with a session, which involves the user equipment and which implicates the network link. The bandwidth request can be modified based on the bandwidth parameter that was identified. In more detailed embodiments, one or more header extensions in one or more packets are evaluated in order to assist in identifying the bandwidth parameter. The one or more header extensions can include a selected one of packet sequence numbers, an average packet transmission rate, an average packet receiving rate, and a packet reception error rate. In other examples, modifying the bandwidth request can include downgrading the bandwidth request to lower a bit rate based on the bandwidth parameter identified for the network link.

16 Claims, 4 Drawing Sheets

U.S. PATENT DOCUMENTS

| | | | |
|---|---|---|---|
| 2006/0199591 | A1 | 9/2006 | Klatt |
| 2006/0281471 | A1 | 12/2006 | Shaffer et al. |
| 2008/0101301 | A1 | 5/2008 | Thomas et al. |
| 2008/0155094 | A1 | 6/2008 | Roese et al. |
| 2008/0253342 | A1 | 10/2008 | So et al. |
| 2009/0163216 | A1 | 6/2009 | Hoang et al. |
| 2009/0219888 | A1 | 9/2009 | Chen et al. |
| 2010/0093351 | A1 | 4/2010 | Barrett et al. |
| 2010/0113032 | A1 | 5/2010 | Lee et al. |
| 2010/0113035 | A1 | 5/2010 | Eskicioglu et al. |
| 2010/0165960 | A1 | 7/2010 | Richardson |

OTHER PUBLICATIONS

U.S. Appl. No. 12/539,446, filed Aug. 11, 2009, entitled "System and Method for Providing Access in a Network Environment," Inventor(s): Steve Hratko et al.

U.S. Appl. No. 12/619,273, filed Nov. 16, 2009, entitled "System and Method for Providing Enterprise Integration in a Network Environment," Inventor(s): Mark Grayson et al.

Wikipedia, "Distributed minimum spanning tree," http://en.wikipedia.org/wiki/Distributed_minimum_spanning_tree, Dec. 18, 2008, 2 pages.

V. Chandrasekhar and J.G.Andrews, "Femtocell Networks: A Survey," The University of Texas at Austin; A. Gatherer, Texas Instruments; Jun. 28, 2008; 23 pages.

Kineto Wireless, Inc., "UMA: The 3GPP Standard for Femtocell-to-Core Network Connectivity," Aug. 2007; 9 pages.

Wikipedia, "Minimum spanning tree," http://en.wikipedia.org/wiki/Minimum_spanning_tree, Dec. 18, 2008, 5 pages.

Wikipedia, "Plectron," http://en.wikipedia.org/wiki/Plectron, Dec. 18, 2008, 2 pages.

Positron Public Safety Systems, "Product Specifications: Power RADIO," http://www.positron911.com/products/powerRADIO/powerRADIO_specs.asp, Dec. 18, 2008, 2 pages.

F. Adrangi et al., Identity Selection Hints for the Extensible Authentication Protocol (EAP); RFC 4284; Jan. 2006; http://ietfreport.isoc.org/rfc/Pdf/rfc4284.pdf; 14 pages.

B. Berry et al., PPP Over Ethernet (PPoE) Extensions for Credit Flow and Link Metrics; RFC 4938; Jun. 2007; http://www.ietf.org/rfc/rfc4938.txt.pdf; 17 pages.

Thunder Eagle, Inc.—Radio Wireless Alerting Systems, "MRI-100™ : Multi Radio Interface," http://www.thuneagle.com/mri100.htm, Dec. 18, 2008, 2 pages.

Broadband Forum, "TR-196 Femto Access Point Service Data Model," Issue 1; Issue Date: Apr. 2009; 131 pages.

USPTO Feb. 29, 2012 Final Office Action from U.S. Appl. No. 12/539,446.

USPTO Apr. 4, 2012 Request for Continued Examination in response to Feb. 29, 2012 Final Office Action from U.S. Appl. No. 12/539,446.

USPTO Jun. 20, 2012 Non-Final Office Action from U.S. Appl. No. 12/539,446.

U.S. Appl. No. 13/551,374, filed Jul. 17, 2012, entitled "System and Method for Indicating a Level of RAN Congestion for User Plane Traffic in a Network Environment," Inventor(s): Nirav Salot et al.

USPTO Jul. 16, 2012 Non-Final Office Action from U.S. Appl. No. 12/619,273.

USPTO Nov. 9, 2011 Nonfinal Office Action from U.S. Appl. No. 12/539,446.

USPTO Sep. 13, 2012 Response to Jun. 20, 2012 Non-Final Office Action from U.S. Appl. No. 12/539,446.

USPTO Oct. 15, 2012 Response to Jul. 16, 2012 Non-Final Office Action from U.S. Appl. No. 12/619,273.

* cited by examiner

SYSTEM AND METHOD FOR PROVIDING RATE CONTROL IN A NETWORK ENVIRONMENT

TECHNICAL FIELD

This disclosure relates in general to the field of communications and, more particularly, to providing rate control in a network environment.

BACKGROUND

Networking architectures have grown increasingly complex in communication environments. For example, femto cells have gained recent notoriety due to their capabilities. In general terms, femto cells represent wireless access points that operate in licensed spectrum to connect mobile devices to a mobile operator's network (e.g., using broadband connections). For a mobile operator, the femto cells offer improvements to both coverage and capacity. For many service network scenarios, bandwidth and/or resource allocation protocols can pose a number of problems for end users and network operators. In other scenarios, local Internet Protocol (IP) network access communications can have similar bandwidth allocation issues. For all of the aforementioned technologies (and for others), bandwidth management presents a significant challenge to network operators, device designers, and system administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes identifying a bandwidth parameter associated with a network link. The method also includes evaluating a bandwidth request associated with user equipment, the bandwidth request is associated with a session, which involves the user equipment and which implicates the network link. The bandwidth request can be modified based on the bandwidth parameter that was identified. In more specific embodiments, one or more header extensions in one or more packets are evaluated in order to assist in identifying the bandwidth parameter. The one or more header extensions can include a selected one of packet sequence numbers, an average packet transmission rate, an average packet receiving rate, and a packet reception error rate. In other examples, modifying the bandwidth request includes downgrading the bandwidth request to lower a bit rate based on the bandwidth parameter identified for the network link. In still other examples, the bandwidth parameter associated with the network link can be subsequently evaluated in order to reverse the downgrading of the bandwidth request.

Example Embodiments

Figure 1:
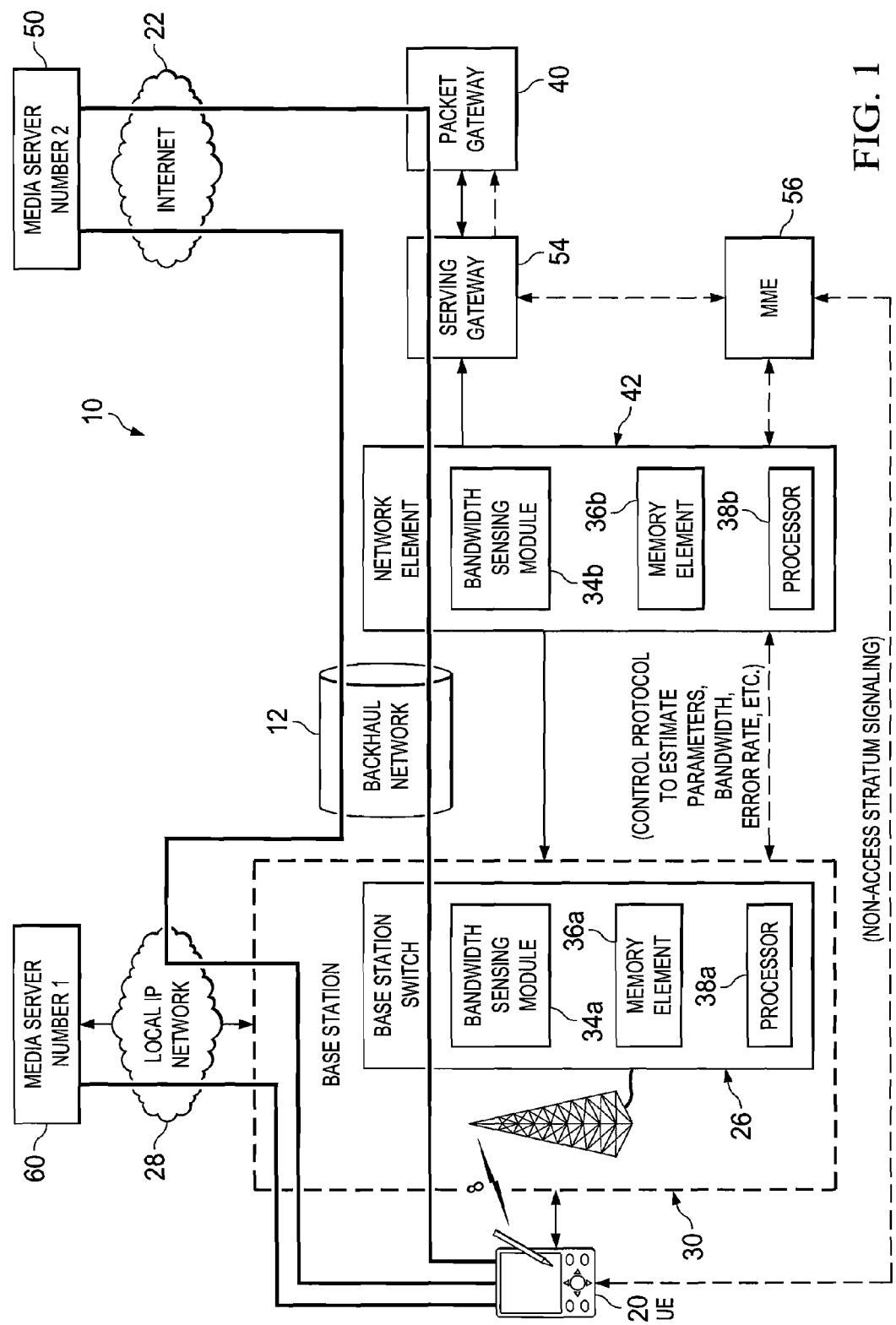
FIG. 1 is a simplified block diagram of a communication system for providing rate control in a network environment in accordance with one embodiment of the present disclosure.

Turning to FIG. 1, FIG. 1 is a simplified block diagram of a communication system 10 for managing rate controls for data transmissions in one example implementation. FIG. 1 may include a backhaul network 12, user equipment (UE) 20, an Internet 22, a local Internet protocol (IP) network 28, a base station 30, and a network element 42. Base station 30 may include a base station switch 26, which can include a bandwidth sensing module 34a, a memory element 36a, and a processor 38a. Similarly, network element 42 may include a bandwidth sensing module 34b, a memory element 36b, and a processor 38b. FIG. 1 may also include a packet gateway 40, a serving gateway 54, a mobility management entity (MME) 56, a media server #1 60, and a media server #2 50.

For purposes of illustrating certain example techniques of communication system 10, it is important to understand the communications that may be traversing the network and which can be used to allocate bandwidth for a given end user. In a wireless network (e.g., satellite, terrestrial cellular, femto, etc.), the dynamic nature of wireless channels can cause an inconsistency with that which can be accommodated by base station 30 (or equivalently, by a femto base station, by a satellite radio gateway, etc.). In specific regards to femto technology, femto cells allow licensed radios to be positioned at the end of a consumer broadband line. As radio technology improves, consumer broadband can limit the throughput of a femto cell. Typically, femto flows can be broken out in the home in which established broadband bottlenecks do not apply.

Consider an example that is illustrative of some of the bandwidth problems that may be encountered and resolved in communication system 10. UE 20 may request a particular bit rate (e.g., data propagation speed) associated with a bearer. For example, UE 20 may request a 1 MB/second uplink bearer, which is simply not feasible. Packets would then traverse the air interface, where a corresponding base station would simply drop these packets. In one sense, this is due to the lack of backpressure from (for example) a digital subscriber line (DSL) modem. Similarly, in a macro network environment, there could be a microwave Ethernet system, which has a connection to a base station that determines whether packets would be dropped at a certain interface (e.g., on a given port).

The femto use case in such a scenario is somewhat more manageable because protocols are terminated at base station 30. Further, specific messages can be used (and further enhanced) to signal particular conditions, downgrade commands, termination activities, etc. For example, a particular service request can be downgraded for UE 20 using appropriate messaging. This messaging is more complicated in the macro network because UE 20 typically sends his bearer request to MME 56, or to a serving general packet radio service (GPRS) support node (SGSN) in the 3 G scenario, etc. and, therefore, that request would have to be intercepted before any downgrading occurred.

Communication system 10 can address these bandwidth issues (and others) in offering an automatic and adaptive rate control for one or more links. In one example implementation, base station 30 can be configured to understand the bandwidth on its associated link with network element 42. This could involve GPRS tunneling protocol (GTP) communications, real-time transport protocol (RTP) communications, or any other suitable protocol (or probing mechanisms) in which bandwidth and delay can be sensed for an associated link. In one example implementation, this sensing activity can be continuous, or at least periodic, such that the bandwidth sensing would occur at routine intervals. Bandwidth sensing modules 34*a-b* are configured to evaluate bandwidth parameters (inclusive of bit rate, quality of service (QoS), uplink capacities and tolerances, backhaul characteristics, etc.) in accommodating and/or downgrading (and possibly upgrading) requests from UE 20. In addition, communication system 10 can offer an optimum scheme for self-limiting long term evolution (LTE) configurations, femto architectures, and various other network topologies, which can be managed according to their current link limitations (e.g., involving backhaul 12).

In more practical terms, a majority of network traffic congestion can occur due to non-RTP/RTP control protocol (RTCP) flows, or at least flows that are not visible to the transport network. The objective is to match uplink radio access bearer (RAB) parameters to the available uplink bandwidth, without affecting existing client functions. Femto is a particular use case, where the RAB capacity commonly exceeds the uplink bandwidth. Given that the bandwidth can be limited on the access link, communication system 10 can offer the use case of a single femto on a single access link. In other scenarios (potentially, less likely), multiple femtos can share a single access link. In an enterprise scenario, a single enterprise controller can be available and, hence, the aggregated bandwidth can be sensed. A local radio resource management functionality can use this sensed bandwidth to optimally allocate bandwidth amongst the femtos in a particular enterprise configuration. In one particular example, base station 30 receives the uplink request, evaluates bandwidth parameters, and subsequently authorizes, or downgrades the request from UE 20. In a macro network example, the same activities can be completed by MME 56, by an SGSN, or by any other element, or by any suitable combination of various network elements.

Consider another example flow in which UE 20 requests a particular radio access bearer configuration. In this particular example, UE 20 has requested an uplink channel, accompanied by a bit rate to be supported. Prior to even receiving this request, base station 30 can continuously monitor its uplink. It should be noted that base station 30 can include intelligence to determine how frequently bandwidth uplink bandwidth should be measured. In this particular example, UE 20 requests a 1 MB/second bit rate on the uplink; however, base station 30 has the intelligence to identify it is operating on one end of a DSL link. In this particular example, base station 30 modifies this request such that when the request propagates through the network, it has been adjusted to account for practical considerations of the current bandwidth for the link. For example, the request is seen by the network in its downgraded format, for example, from a requested 1 MB/second bit rate to a more reasonable 300 KB/second bit rate. This downgraded signaling can flow through the network, where a chain of negotiations in the control plane traverses back toward UE 20, which ultimately receives a 300 KB/second uplink speed.

Separately, communication system 10 can also accommodate communications involving local IP network 28. Hence, there is enhanced intelligence in base station 30 and/or network element 42 in defining where flows should be routed. In situations where base station 30 has a local IP access (LIPA) functionality, base station 30 can determine which flows should propagate over local IP network 28 and/or backhaul network 12. Thus, base station 30 has the ability to breakout local flows involving UE 20. Consider a use case for a femto cell in which an individual would like to access his photos, music, etc., which may be provided in media server #1 60. Packets associated with these activities do not have to extend out to the service network and, instead, can be routed directly through local IP network 28. In one particular example, base station 30 can terminate flows for UE 20 and also provide network address translation (NAT) for such flows (e.g., between the IP address allocated by packet gateway 40 and the IP address of local IP network 28). More specific operations are best understood via one or more additional examples that are offered below with reference to FIGS. 2-4. Before turning to some of the operations of this architecture, a brief discussion is provided about some of the infrastructure of FIG. 1.

UE 20 can be associated with clients, customers, or end users wishing to initiate a communication in communication system 10 via some network. The term 'user equipment' is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. UE 20 may also be inclusive of a suitable interface to the human user, such as a microphone, a display, or a keyboard or other terminal equipment. UE 20 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. On power up, UE 20 can be configured to initiate a request for a connection with a service provider. A user agreement can be authenticated by the service provider based on various service provider credentials (e.g., subscriber identity module (SIM), Universal SIM (USIM), certifications, etc.). More specifically, a device can be authenticated by the service provider using some predetermined financial relationship.

Base station 30 can include base station switch 26, along with any appropriate transceivers and/or controllers to assist in its operations. The communications interface provided by the radio access network (e.g., of a Node B) may allow data to be exchanged between UE 20 and any number of selected elements within communication system 10. Base station 30 may facilitate the delivery of a request packet generated by UE 20 and, further, the reception of information sought by an end user. Base station 30 is only one example of a communications interface between UE 20 and the service network. Other suitable types of communications interfaces may be used for any appropriate network design and, further, be based on specific communications architectures.

In one particular example, base station 30 is a femto access point (i.e., a femto base station), which represents a small cellular base station designed for use in residential or business environments. The femto access point can connect to the service provider's network via broadband (such as DSL, WiMAX, WiFi, cable, etc.) in one example. The femto access point can offer an access point base station, and support multiple active mobile nodes in a given setting (e.g., business, residential, etc.). In one example implementation, the femto access point communicates with UE 20 over a radio interface using licensed spectrum and, further, connects to the mobile network infrastructure over a fixed broadband connection. The femto cell can allow a service provider to extend service coverage indoors, especially where access would otherwise be limited or unavailable. The femto cell can incorporate the functionality of a typical base station, but extend it to allow a simpler, self-contained deployment. An example implementation of the femto access point is a Universal Mobile Telecommunications System (UMTS) femto cell containing a Node B and components of a radio network controller (RNC) and Ethernet for the backhaul. The concepts presented herein are applicable to all standards, including GSM, code division multiple access (CDMA) 2000, WCDMA, Time Division Synchronous CDMA, WiMAX, LTE, etc.

Packet gateway 40 is a packet data node (PDN) gateway that provides connectivity from UE 20 to external packet data networks by being the point of exit and entry of traffic for UE 20. UE 20 may have simultaneous connectivity with more than one packet gateway 40 for accessing multiple PDNs. Packet gateway 40 can perform policy enforcement, packet filtering, charging support, lawful interception of messages and signaling, packet screening, etc. Packet gateway 40 can also act as the anchor for mobility between 3 GPP and non-3 GPP technologies such as WiMAX and 3 GPP2.

Network element 42 and base station 30 are devices configured to facilitate service flows between endpoints and a given network (e.g., for networks such as those illustrated in FIG. 1). As used herein in this Specification, the term 'network element' is meant to encompass both of these devices and, further, could be in the form of routers, switches, gateways, bridges, loadbalancers, firewalls, servers, processors, controllers, network nodes, modules, or any other suitable device, component, element, or object operable to exchange information in a network environment. The network elements may include bandwidth sensing modules 34a-b to support the activities associated with bandwidth management, as outlined herein. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network element 42 and/or base station 30 can include software (e.g., bandwidth sensing modules 34a-b) to achieve or to foster the bandwidth sensing operations, as outlined herein in this document. Note that in one example, base station 30 includes base station switch 28, which can have an internal structure (e.g., with a processor, a memory element, etc.) to facilitate some of the operations described herein. This internal structure may be provided in other internal elements within base station 30. In other embodiments, all of these bandwidth-sensing features may be provided externally to these elements or included in some other network element to achieve this intended functionality. Alternatively, network element 42 and base station 30 include this software (or reciprocating software) that can coordinate with each other in order to achieve the bandwidth management operations, as outlined herein. In still other embodiments, one or both of these devices may include any suitable algorithms, hardware, software, components, modules, interfaces, or objects that facilitate the operations thereof.

In operation, network element 42 can provide access gateway functions between (for example) a wireless domain and an IP network. In example embodiments, it can be the first hop IP router from the user's perspective and, further, provide network access server (NAS) and accounting client capabilities for interaction with an authentication, authorization, and accounting (AAA) servers. Network element 42 can also support access network authentication and security functions. Network element 42 can also provide local mobility anchor capability so that users can move between base stations. Network element 42 can also cache authentication and security information to accommodate a fast roaming of users across base stations, or between gateways, and network element 42.

Network element 42 can provide the termination of a mobility function across base stations and the foreign agent function. Network element 42 can also map the radio bearer to the IP network. Additionally, it can act as an IP gateway for the IP host function that is located on the corresponding base station. In certain examples, network element 42 can offer IP functions performed for the access network including end-to-end quality of service, mobility, and security.

Note that, depending on the network, there may be difficulties with the delay between the reporting of a need to adjust the aggregate maximum bit rate (AMBR)/guaranteed bit rate (GBR) and the actual conditions at the point when the adjustment is ultimately applied. In some instances, bandwidth constraints may have improved. Thus, communication system 10 (e.g., through network element 42 and/or base station 30) can offer a mechanism for upgrading bandwidth allocations. Sensing of the bandwidth can be performed repeatedly, with a defined periodicity, where these activities can be used in conjunction with reversing previous downgrade decisions.

A given Node B (e.g., in femto architectures) can use radio measurements to provide an enhanced resource allocation functionality. The reporting in this case can be performed by the transport network. Node Bs can have a measurement capability both locally and remotely (for UE 20) and, further, perform resource allocation that considers these measurements. Communication system 10 can use bandwidth measurements both locally (e.g., at a Node B) and remotely (e.g., via network element 42 or a security gateway or a home Node B (HNB) gateway) together with flow destinations (e.g., selective IP traffic offloading (SIPTO), non-SIPTO) to perform resource allocations. Hence, communication system 10 can provide the dynamic data needed to characterize backhaul 12 and, further, constrain actual data use within the limits that are present.

In one particular example involving a femto cell, IP addresses can be seen by the femto cell, where the femto cell has an understanding of the home network addressing. The femto cell can measure traffic on a given link and identify circumstances tending to suggest that traffic is coming from the service network. Along similar reasoning, the femto cell can also identify when traffic is propagating to local IP network 28. Thus, the local traffic and tunneled traffic can traverse the same underlying radio link and physical media path until they split along the physical path. In a generic sense, and with reference to particular links in the GTP architecture, communication system 10 can effectively create a data tunnel within a data tunnel. Continuing along with this analogy, the GTP tunnel can be viewed as the inner tunnel, where the bandwidth allocated by a backhaul provider (e.g., cable) to a femto cell can be viewed as the outer tunnel. Local traffic can flow outside a GTP tunnel, but still inside the bandwidth tunnel. In using bandwidth sensing modules 34a-b, the outer tunnel may change size dynamically, while the inner tunnel size can be controlled by GTP extensions. The inner tunnel may require adjustments to remain smaller than the outer tunnel. These adjustments may also leave room for a certain amount of local traffic. In one example, the IP address assigned to the GTP tunnel can be farther into the wireless network system, while the IP address for the local traffic can point to a link closer to the femto cell.

Returning to the infrastructure of FIG. 1, in general terms, serving gateway 54 is associated with an SGSN user plane in an IP network. In other instances, serving gateway 54 could be an IP-enabled RNC. Serving gateway 54 can be configured to route and to forward user data packets, while also acting as the mobility anchor for the user plane during inter-Node B handovers. Serving gateway 54 can act as the anchor for mobility between LTE and other 3 GPP technologies (i.e., terminating the S4 interface and relaying the traffic between 2 G/3 G systems and packet gateway 40). For idle-state UEs, serving gateway 54 can terminate the data path and trigger paging when data arrives for UE 20. Serving gateway 54 can also manage and store UE contexts (e.g., parameters of the IP bearer service, network internal routing information, etc.).

MME 56 can be configured to operate as a control node for the LTE access-network. It further can be responsible for idle mode UE tracking and paging procedures (e.g., including retransmissions). Furthermore, MME 56 can be involved in the bearer activation/deactivation process and can be responsible for choosing serving gateway 54 for UE 20 at the initial attach (and at time of an intra-LTE handover involving core network node relocation). MME 56 can also be responsible for authenticating the user. MME 56 also provides the control plane function for mobility between LTE and 2 G/3 G access networks with the S3 interface, terminating at MME 56 from an SGSN.

In regard to particular applications involving UE 20, media server #1 60 and media server #2 50 can represent one or more video servers, which can provide streaming video to an individual associated with UE 20. For example, an individual could be uploading (or streaming) video over the network to which UE 20 is connected. This could involve technologies such as flip video, webcams, YouTube, and various other video technologies involving any type of uploading and/or streaming video data.

Figure 2:
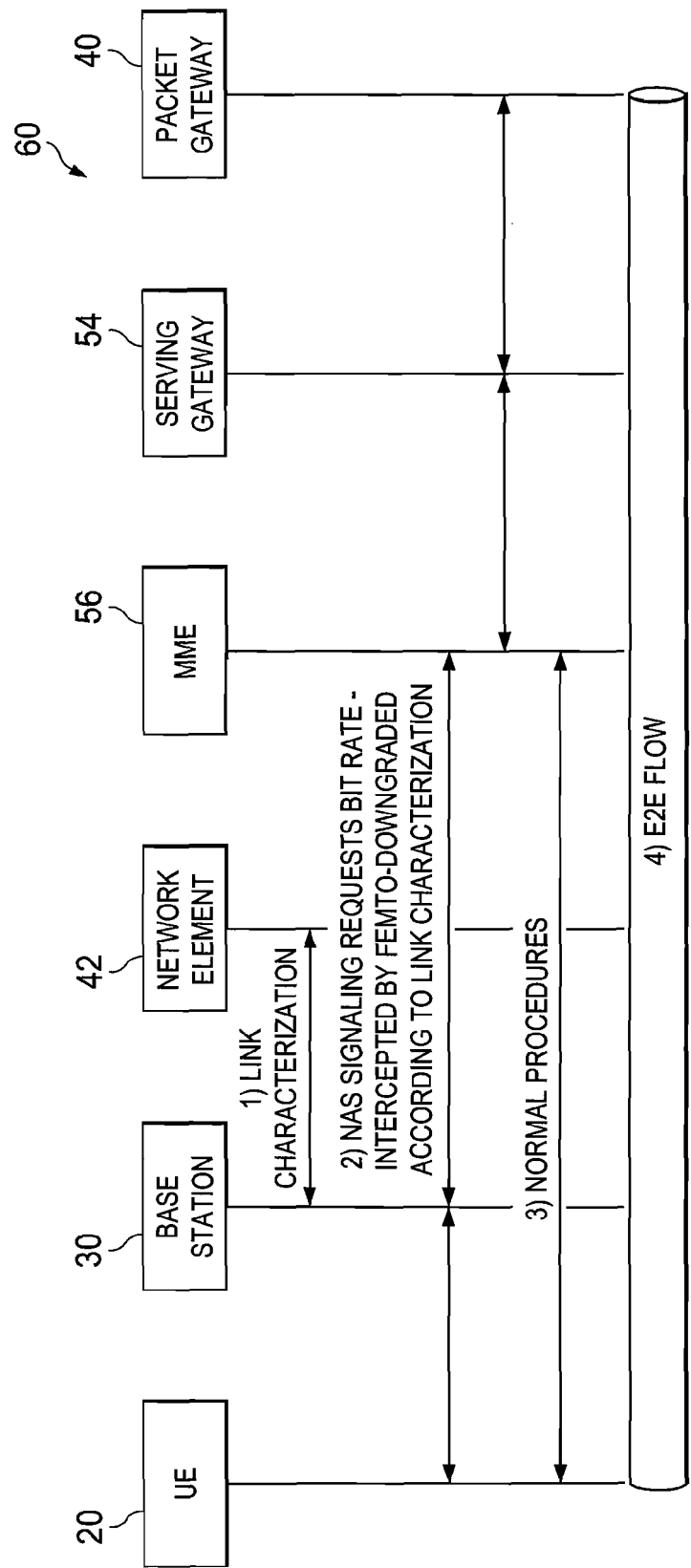
FIGS. 2-4 are simplified flow diagrams illustrating potential operations associated with the communication system.

FIG. 2 is a simplified flow diagram 60 illustrating one example implementation associated with communication system 10. This particular example involves a femto cell, which can be part of a femto base station that serves the same functionalities as those described above with respect to base station 30. In this particular example, as shown in step one, a link characterization occurs between base station 30 and network element 42. This could involve bandwidth sensing modules 34*a-b*, which can systematically identify bandwidth parameters associated with one or more links. At step two, NAS signaling requests a specific bit rate. This request is intercepted by the femto cell, where the request is appropriately downgraded according to the link characterization. At step three, typical data transmission procedures/negotiations/signaling can occur between UE 20 and MME 56. At step four, end-to-end (E2E) communications can occur involving UE 20 and one or more networks. Note that these communications are defined by the downgrade that occurred previously in step two.

In typical configurations, an LTE femto cell architecture can have a GTP tunnel between a femto cell and a security gateway (Se-GW)/serving gateway (SGW) 54. If the backhaul is congested, the AMBR limits in packet gateway 40 can be insufficient. Packets can be systematically dropped over the backhaul network, leading to degrading conditions that inhibit a quality experience for individuals operating UE 20. A given femto cell is configured to negotiate the use of proprietary GTP headers between the femto cell and the SeGW/serving gateway 54. The header extensions can include sequence numbers, an average transmission or receiving rates sent over serving gateway 54 to the femto interface, a packet reception error rate, negotiated AMBR/guaranteed bit rate (GBR) values, or any other appropriate parameter are characteristic that may be provided via header extensions.

Network element 42 can use header extensions to identify that an original bit rate request (for example, 2 MB/second) was made; however, the average uplink throughput is actually 250 KB/second. A given femto cell can identify how many packets are sent into the network and, further, it can receive information from network element 42 indicating that network element 42 is only receiving a fraction of the originally requested rate. Therefore, an inference can be made that packets are being dropped such that a renegotiation of the bit rate should be executed.

Rate averaging can allow network element 42 to provide a device (e.g., residing at the far end of the link) with sending and receiving averages values (e.g., over the last minute, the last hour, the last day, etc.). A given femto cell can be configured to determine instantaneous backhaul bandwidth. In regards to the local IP access activities, a given femto cell can be configured to determine what percentage of the RAB bandwidth is being backhauled over the S1-U interface (e.g., compared to flows that may be routed locally over local IP network 28). Furthermore, the femto cell can be configured to indicate to the mobile if the GBR/AMBR cannot be sustained due to backhaul bandwidth. Additionally, the SeGW/serving gateway 54 can be configured to determine if the backhaul bandwidth can sustain the AMBR/GBR signaled by the femto cell. If the bit rate cannot be sustained, the SeGW/serving gateway 54 is operable to indicate to MME 56 that a packet data protocol (PDP) context modification should occur with a downgrade in the AMBR/GBR in order to enable a successful transmission over backhaul network 12. The downgrade can involve QoS, the radio accessed bearer, or any other suitable link parameter.

Figure 3:
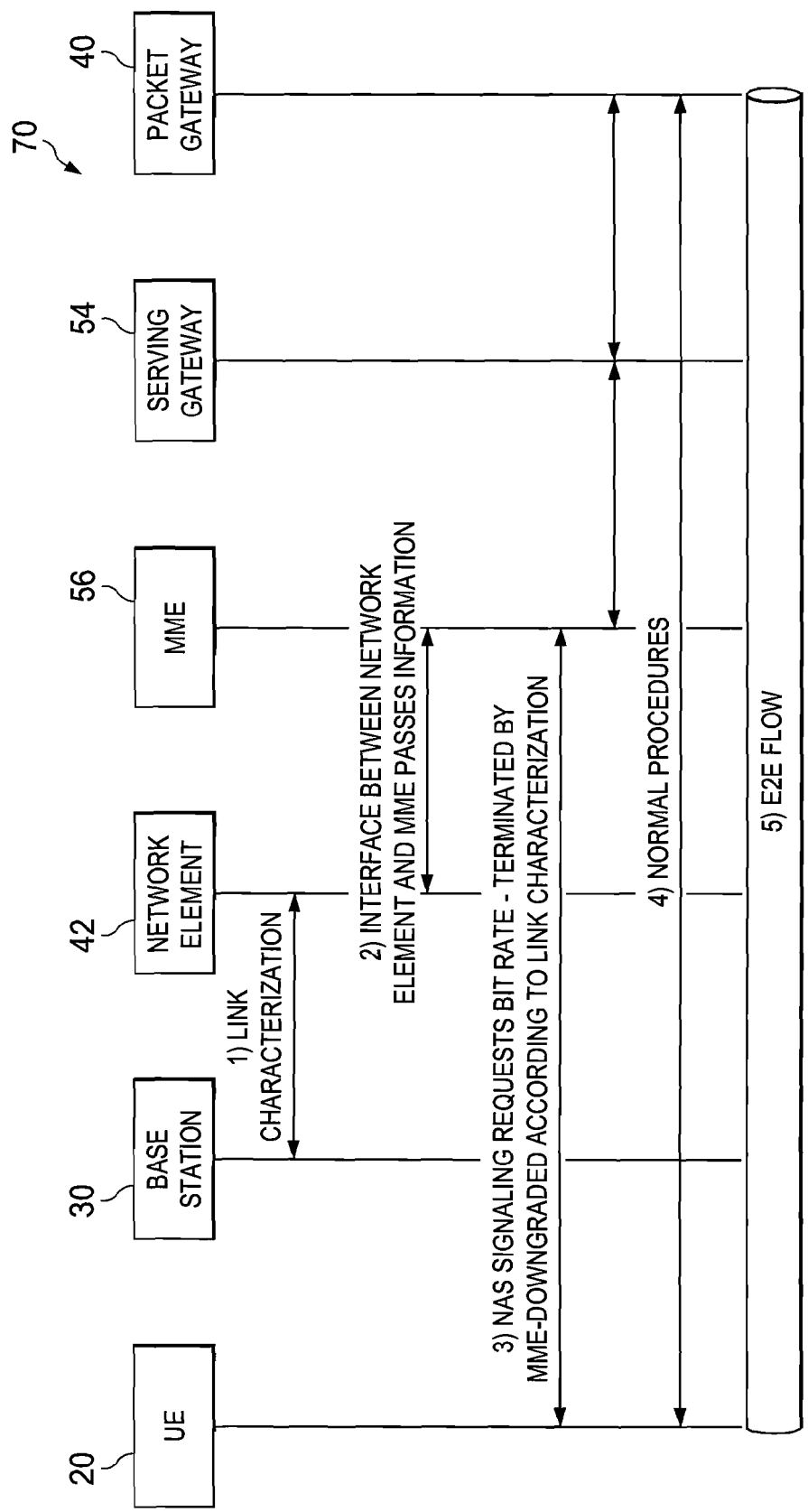

Turning to FIG. 3, FIG. 3 is a simplified flow diagram 70 illustrating another example associated with communication system 10. At step one, a link characterization occurs between base station 30 and network element 42. At step two, and interface between network element 42 and MME 56 passes information associated with this particular link. At step three, NAS signaling is used to request a given bit rate. This request is terminated by MME 56, where the request is appropriately downgraded according to the link characterization of step one. At step four, typical data transmission procedures/negotiations/signaling can occur between UE 20 and packet gateway 40. At step five, end-to-end communications occur involving UE 20 and one or more networks, where such communications have links defined by the downgrade that occurred previously.

Figure 4:
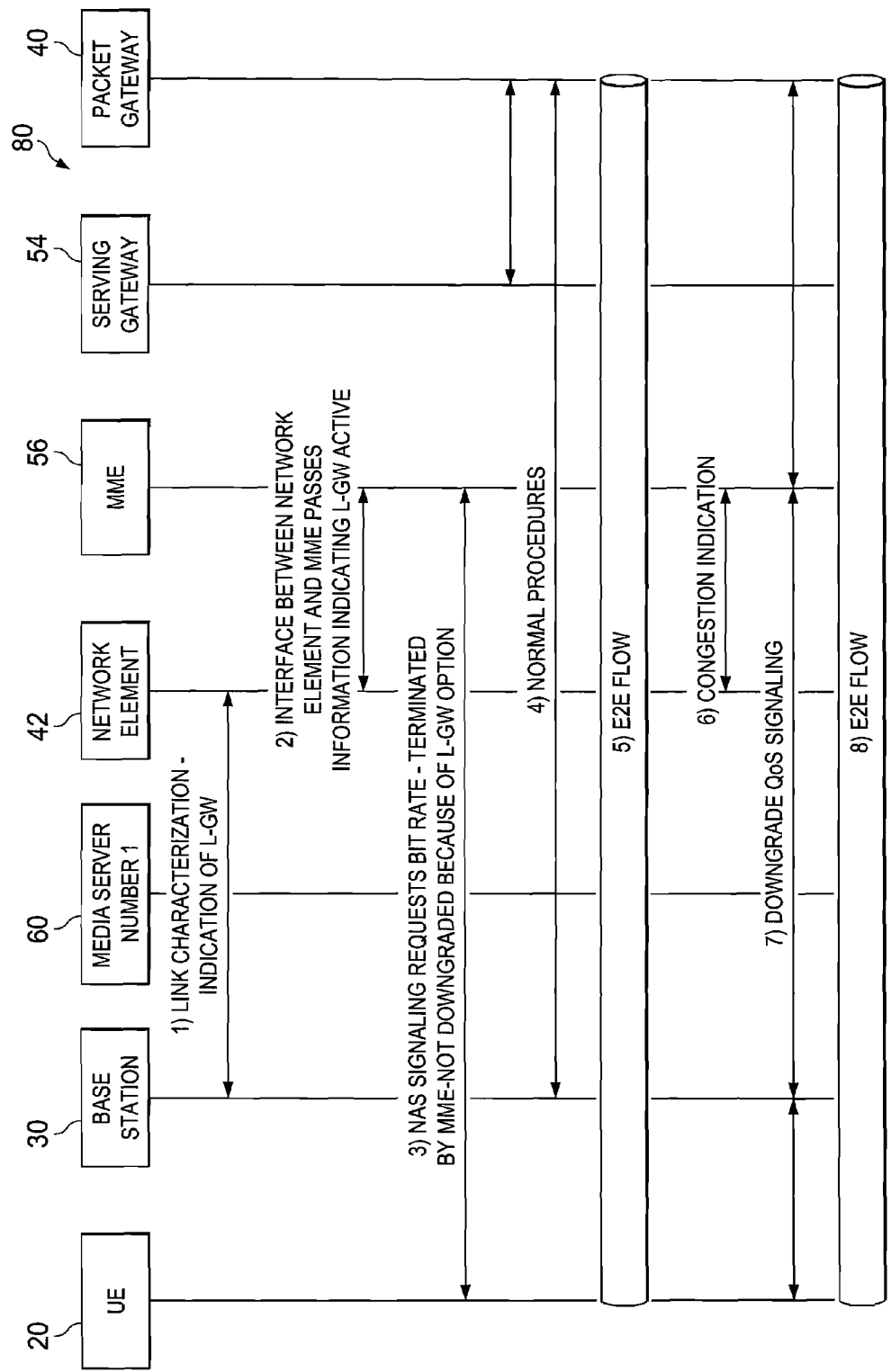

FIG. 4 is a simplified flow diagram 80 illustrating another example associated with communication system 10. In step one, a link characterization occurs, where this signaling includes interactions between base station 30 and network element 42. This particular signaling offers an indication of a local gateway (L-GW) option for this specific request. Network element 42 and MME 56 interact at step two, where MME 56 passes information indicating that the L-GW is active. At step three, NAS signaling requests a given bit rate, which is terminated by MME 56. This particular request is not downgraded because of the L-GW option. At step four, typical data transmission procedures/negotiations/signaling can occur between UE 20 and packet gateway 40. At step five, an end-to-end flow is established for UE 20 and packet gateway 40. At step six, a congestion indication is exchanged between MME 56 and network element 42. At step seven, a downgrade for QoS signaling occurs between base station 30 and MME 56. At step eight, end-to-end communications occur involving UE 20 and packet gateway 40, where such communications have links defined by the downgrade that occurred previously.

Note that in certain example implementations, the bandwidth sensing and/or downgrading functions outlined herein may be implemented by logic encoded in one or more tangible media (e.g., embedded logic provided in an application specific integrated circuit [ASIC], digital signal processor

[DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, network element 42 and/or base station 30 include software in order to achieve the bandwidth sensing and/or downgrading functions outlined herein. These activities can be facilitated by bandwidth sensing modules 34a-b. Both network element 42 and/or base station 30 can include memory elements for storing information to be used in achieving the bandwidth sensing and/or downgrading operations as outlined herein. Additionally, each of these devices may include a processor that can execute software or an algorithm to perform the bandwidth sensing and/or downgrading activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

In a separate endeavor, communication system 10 can generally be configured or arranged to represent the LTE architecture, the 3 G architecture applicable to UMTS environments, or any suitable networking system or arrangement that provides a communicative platform for communication system 10. In other examples, FIG. 1 could readily include an SGSN, a gateway GPRS support node (GGSN), any type of network access server, network node, etc. Moreover, the present disclosure is equally applicable to other cellular and/or wireless technology including CDMA, Wi-Fi, WiMax, etc.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain backhaul links, AAA, and authentication protocols, communication system 10 may be applicable to other exchanges, routing protocols, authentication protocols, or routed protocols in which packets (not necessarily the routing protocol/packets described) are exchanged in order to provide bandwidth sensing (and subsequent adjustment) activities. In addition, other example environments that could use the features defined herein include Pico architectures, where an appropriate bandwidth sensing (and possible bandwidth adjustment for associated links) could occur for UE 20.

What is claimed is:

1. A method, comprising:
   identifying a bandwidth parameter associated with a network link;
   evaluating a bandwidth request associated with user equipment, wherein the bandwidth request is associated with a session, which involves the user equipment and which implicates the network link;
   modifying the bandwidth request based on the bandwidth parameter that was identified;
   identifying a local gateway (L-GW) option for a subsequent request; and
   determining not to downgrade the network link based on the L-GW option being present.

2. The method of claim 1, wherein one or more header extensions in one or more packets are evaluated in order to assist in identifying the bandwidth parameter, and wherein the one or more header extensions include a selected one of packet sequence numbers, an average packet transmission rate, an average packet receiving rate, and a packet reception error rate.

3. The method of claim 2, wherein modifying the bandwidth request includes downgrading the bandwidth request to lower a bit rate based on the bandwidth parameter identified for the network link.

4. The method of claim 3, wherein the bandwidth parameter associated with the network link is subsequently evaluated in order to reverse the downgrading of the bandwidth request.

5. The method of claim 2, wherein one or more of the header extensions include negotiated aggregate maximum bit rate (AMBR)/guaranteed bit rate (GBR) values.

6. The method of claim 5, further comprising:
identifying that the AMBR/GBR value cannot be sustained due to the bandwidth parameter; and
communicating to a mobility management entity (MME) that a packet data protocol (PDP) context modification should occur for downgrading the network link.

7. Logic encoded in a non-transitory computer readable medium that includes code for execution and when executed by a processor operable to perform operations comprising:
identifying a bandwidth parameter associated with a network link;
evaluating a bandwidth request associated with user equipment, wherein the bandwidth request is associated with a session, which involves the user equipment and which implicates the network link; and
modifying the bandwidth request based on the bandwidth parameter that was identified, wherein the bandwidth parameter associated with the network link is subsequently evaluated in order to reverse a downgrading of the bandwidth request.

8. The logic of claim 7, wherein one or more header extensions in one or more packets are evaluated in order to assist in identifying the bandwidth parameter, and wherein the one or more header extensions include a selected one of packet sequence numbers, an average packet transmission rate, an average packet receiving rate, and a packet reception error rate.

9. The logic of claim 8, wherein one or more of the header extensions include negotiated aggregate maximum bit rate (AMBR)/guaranteed bit rate (GBR) values.

10. The logic of claim 8, being further operable to perform operations comprising:
identifying that the AMBR/GBR value cannot be sustained due to the bandwidth parameter; and
communicating to a mobility management entity (MME) that a packet data protocol (PDP) context modification should occur for downgrading the network link.

11. The logic of claim 7, being further operable to perform operations comprising:
identifying a local gateway (L-GW) option for a subsequent request; and
determining not to downgrade the network link based on the L-GW option being present.

12. An apparatus, comprising:
a memory element configured to store data,
a processor operable to execute instructions associated with the data, and
a bandwidth sensing module configured to:
identify a bandwidth parameter associated with a network link;
evaluate a bandwidth request associated with user equipment, wherein the bandwidth request is associated with a session, which involves the user equipment and which implicates the network link; and
modify the bandwidth request based on the bandwidth parameter that was identified, wherein one or more header extensions in one or more packets are evaluated in order to assist in identifying the bandwidth parameter, and wherein the one or more header extensions include a selected one of packet sequence numbers, an average packet transmission rate, an average packet receiving rate, and a packet reception error rate, and wherein one or more of the header extensions include negotiated aggregate maximum bit rate (AM BR)/guaranteed bit rate (GBR) values.

13. The apparatus of claim 12, wherein modifying the bandwidth request includes downgrading the bandwidth request to lower a bit rate based on the bandwidth parameter identified for the network link.

14. The apparatus of claim 13, wherein the bandwidth parameter associated with the network link is subsequently evaluated in order to reverse the downgrading of the bandwidth request.

15. The apparatus of claim 12, wherein the bandwidth sensing module is further configured to:
identify that the AMBR/GBR value cannot be sustained due to the bandwidth parameter; and
communicate to a mobility management entity (MME) that a packet data protocol (PDP) context modification should occur for downgrading the network link.

16. The apparatus of claim 12, wherein the bandwidth sensing module is further configured to:
identify a local gateway (L-GW) option for a subsequent request; and
determine not to downgrade the network link based on the L-GW option being present.

* * * * *